United States Patent [19]

Roodenrijs

[11] Patent Number: 5,137,739

[45] Date of Patent: Aug. 11, 1992

[54] PROCESS FOR PRODUCING CONCENTRATED FOOD LIQUIDS

[75] Inventor: Jacobus P. Roodenrijs, St. Michielsgestel, Netherlands

[73] Assignee: Grasso's Koninklijke Machinefabrieken ..., Netherlands

[21] Appl. No.: 591,754

[22] Filed: Oct. 2, 1990

[30] Foreign Application Priority Data

Oct. 23, 1989 [NL] Netherlands .......................... 8902621

[51] Int. Cl.$^5$ .......................... A23L 2/00; B01D 9/00
[52] U.S. Cl. .......................... 426/384; 62/532; 62/541; 426/594; 426/599
[58] Field of Search ............... 426/384, 385, 599, 594; 62/123, 532, 541, 544

[56] References Cited

U.S. PATENT DOCUMENTS

| | | | |
|---|---|---|---|
| 2,903,371 | 9/1959 | Toulmin, Jr. | 426/384 |
| 2,986,012 | 5/1961 | Toulmin, Jr. | 62/541 |
| 3,156,571 | 11/1964 | Walker | 426/384 |
| 3,361,570 | 1/1968 | Malick | 426/384 |
| 3,404,012 | 10/1968 | Craig | 426/384 |
| 3,803,861 | 4/1974 | Ganiaris | 62/123 |
| 3,845,230 | 10/1974 | Dwyer, Jr. | 426/384 |
| 4,463,025 | 7/1984 | Strobel | 426/384 |

FOREIGN PATENT DOCUMENTS 0051340 5/1982 European Pat. Off. .

Primary Examiner—George Yeung
Attorney, Agent, or Firm—Longacre & White

[57] ABSTRACT

Process for freeze-concentrating food liquids such as fruit juices, coffee extracts, beer and so forth, in which the substance to be treated is conveyed through a multi-stage freeze concentrator and is conveyed from the freeze concentrator stage with the highest concentration to a module in which the concentration, and thus the viscosity, is increased by crystallization, and a partial separation of mother liquor is obtained by means of a contrifuge.

9 Claims, 3 Drawing Sheets

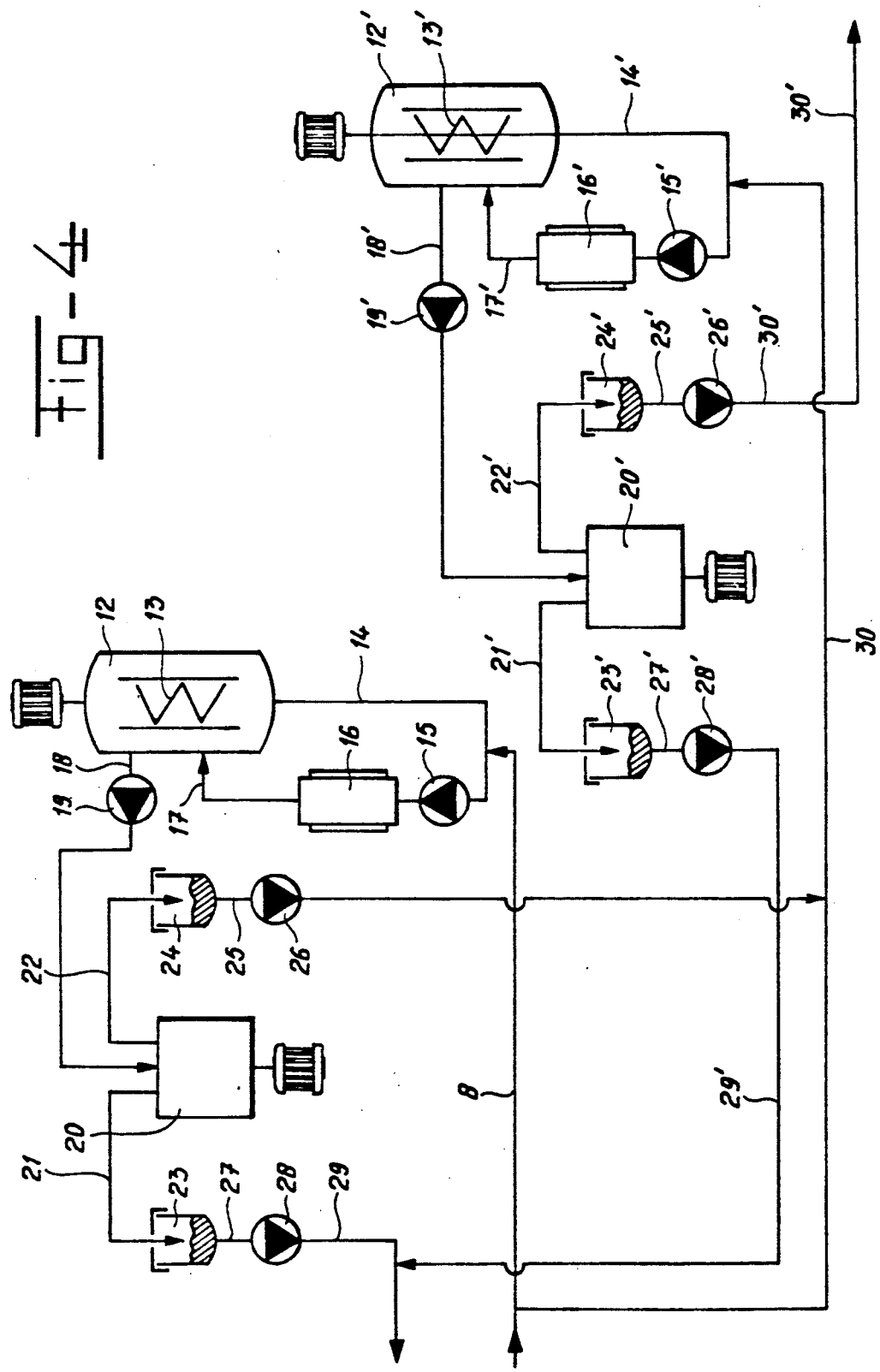

PROCESS FOR PRODUCING CONCENTRATED FOOD LIQUIDS

The present invention relates to a process for freeze-concentrating food liquid such as fruit juices, coffee extract, beer and so forth, in which the substance to be treated is conveyed through a multi-stage freeze concentrator. Such a process is known from EP-B-0,051,340 of Applicants, which shows a different development of U.S. Pat. No. 4,004,886, in which a single-stage process is shown.

There are many reasons for concentrating fruit juices, coffee extract, beer, milk, vinegar and other food liquids. Among the reasons are better storage stability and savings on transportation and storage costs.

If the concentration is carried out as a preliminary stage to processes such as freeze-drying, the object of the concentration is generally a reduction of capital investment and a saving on energy costs.

Various techniques are available for the concentration, such as evaporation, membrane separation and freeze-concentration. Each of these techniques has its own field of application as a result of its characteristic features. Freeze-concentration can be characterized as the process which yields the highest product quality, since it takes place at low temperature, with the result that no thermal decomposition can occur, and because the process is carried out in a closed, pressurized system, in which no losses of flavour and aroma and no oxidation occur.

When freeze-concentration is applied, the maximum obtainable concentration level is determined by the viscosity of the concentrate.

Typical values for concentration levels are 50 wt % for fruit juices, 40 wt % for coffee extract, and 45 wt % for dairy products. It would be of considerable importance for the fruit juice application if the maximum concentration level could be raised to 55/wt %, which is the minimum concentration for bulk handling.

Table 1 shows the impact on storage and transportation costs when there is a change from drum packing to bulk handling.

TABLE 1

Storage and transport costs for fruit juices with a concentration of 65 wt %, expressed in guilders/ton solids.

|  | Drum | Bulk |
|---|---|---|
| Cost of drums | 107 | — |
| Packaging costs | 180 | — |
| Storage costs | 120 | 302 |
| Transporting material into and out of storage room | 95 | 25 |
| Loss of solids at receiving side (1.5%) | 85 | — |
|  | 590 | 327 |
| Transport costs eg. from Brazil to USA | 385 | 207 |
| Total | 975 | 534 |

A higher concentration level is also advantageous in the coffee extract application. Here the main reason is the increase in aroma retention in the drying stage which takes place after freeze-concentration if the concentration of the feed to that stage is increased.

The present invention relates to a process which supplies a freeze-concentrated product with at least 55 wt % for fruit juices and 50 wt % for coffee extract.

The object of the present invention is to produce a product of high viscosity through freeze-concentration.

This is achieved according to the invention in that the substance to be treated is conveyed from the freeze concentrator stage with the highest concentration to a module in which the viscosity is increased by crystallization.

The module has two basic sections, viz. a section in which the water in the liquid is crystallized, in which process ice crystals of 5–100 μm are produced, and a section where the slurry is thickened and in which the slurry is separated by means of a centrifuge from the crystallization section into a concentration ice stream and a product stream, the mother liquor.

According to the invention, two different crystallization and separation technologies are thus combined. A high concentration situation means a high viscosity of the end product.

FIG. 1 of the application shows a viscosity graph for coffee extract and for orange juice. Commercially available freeze concentrators produce a product in the region of 30–100 centistokes. The invention is capable of producing products of much higher viscosities, in particular between 100 and 500 centistokes (1 centistoke is $10^{-6} m^2/\text{sec.}$).

A higher viscosity influences the freeze concentrator in various ways:

It reduces the heat transfer in the scraped surface heat exchanger, thereby making it less efficient;

It increases the power consumption of the various agitators, pumps and the like;

It slows down crystal growth.

The small average crystal size combined with the high viscosity of the liquid currently limits the maximum obtainable concentration, because it blocks the filters in the ripening tank of a conventional freeze concentrator.

The filters in the ripening tank of a conventional freeze concentrator serve a dual function: they ensure that the crystal-free liquid stream is circulated over the scraped surface heat exchangers and they are necessary to remove a crystal-free product stream. For the latter, the invention makes use of a centrifuge, while the crystallization system has been changed to slurry crystallization, making the crystal-free liquid circulation over the heat exchangers unnecessary.

Although the average crystal size drops considerably when slurry crystallization is used instead of separated nucleation and growth crystallization (see Table 2), its disadvantages are outweighed by the advantage of not using filters.

TABLE 2

Effect of crystallization system on average crystal size for a 50 wt % sugar solution (130 centistokes).

| Method | Average size |
|---|---|
| Separated nucleation and growth | 404 μm |
| Slurry crystallization | 185 μm |

The invention will now be explained in greater detail with reference to the drawing, in which:

FIG. 3 shows the combination of this concentrator with the module according to the invention; and FIG. 4 shows a double-stage embodiment of the module according to FIG. 3.

Figure 1:
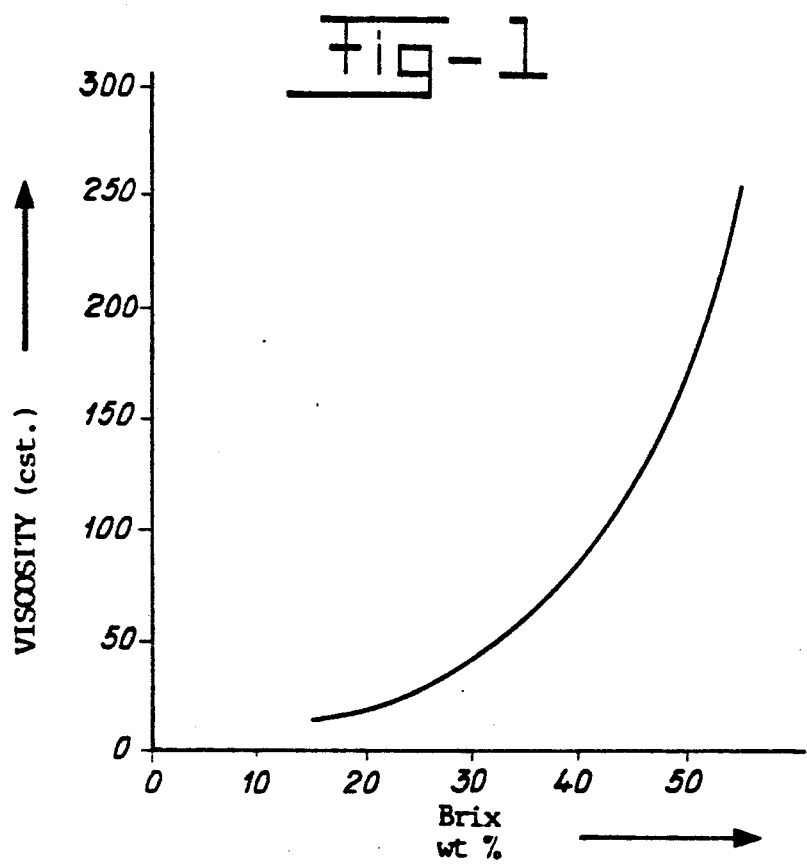
FIG. 1 shows the relation between the viscosity of fruit juice and coffee extract at freezing point, depending on wt %.
Figure 2:
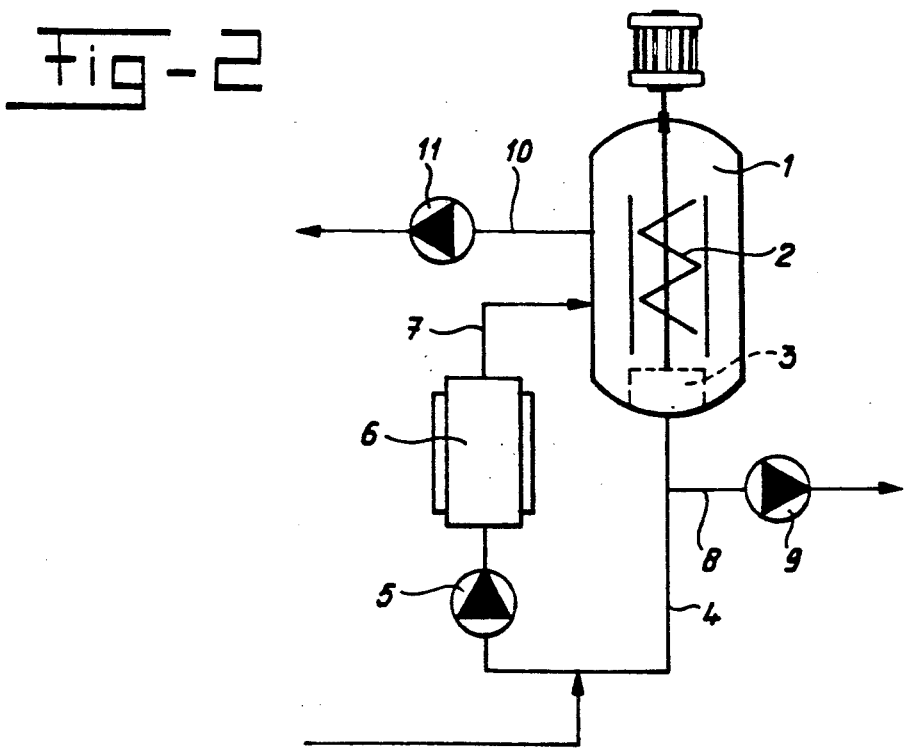
FIG. 2 is a flow diagram of the highest concentration stage of a conventional multi-stage freeze concentrator.
Figure 2:
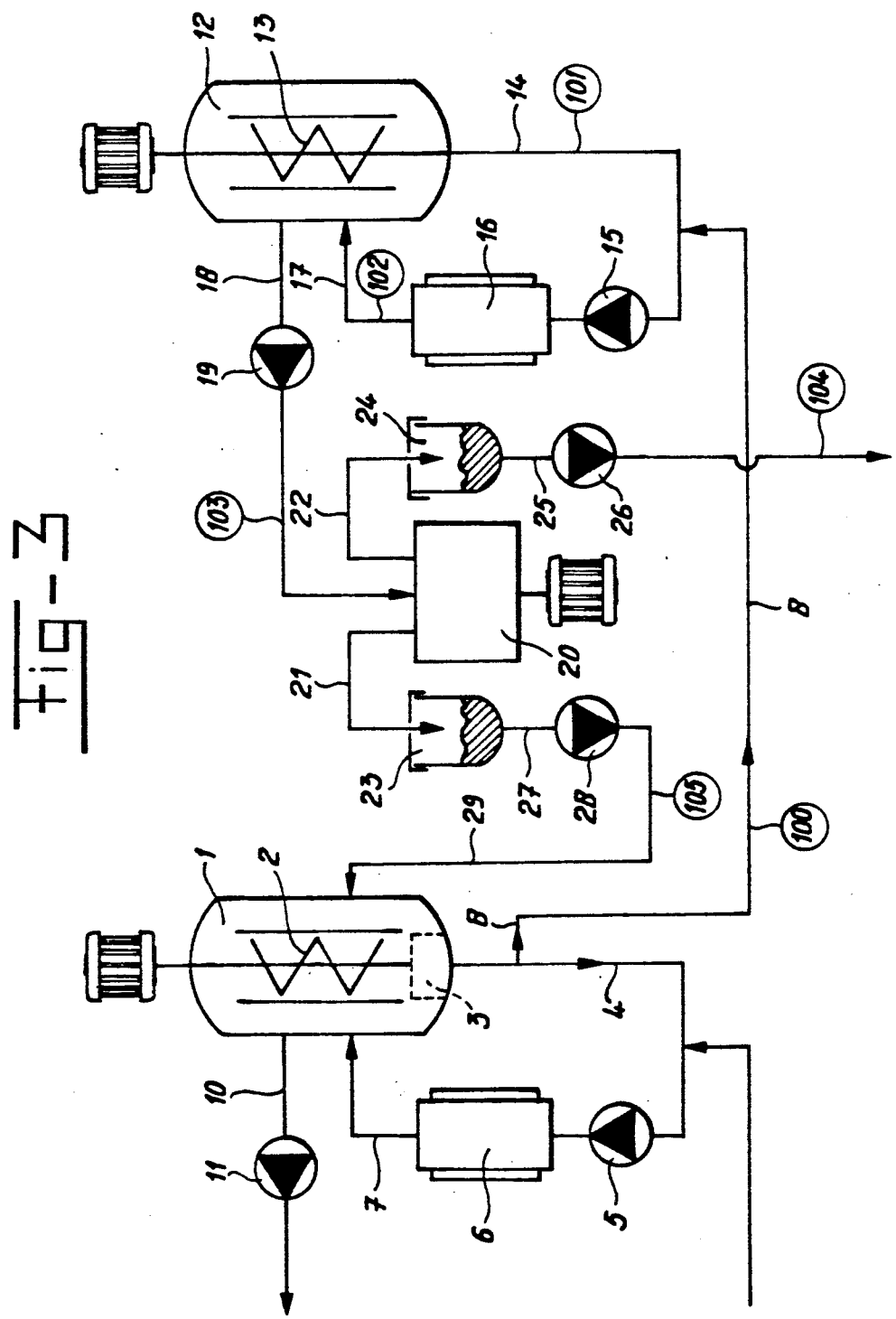

FIG. 2 shows a conventional freeze concentrator, comprising a ripening tank 1, containing a movable mixing element 2 and a filter 3. Connecting to the filter 3 is a pipe 4 in which a pump 5 connected to as scraped surface heat exchanger 6 is disposed. A pipe 7 runs from the heat exchanger 6 to the ripening tank 1.

A pipe 8 in which a pump 9 is disposed runs from the pipe 4. In a conventional freeze concentrator the concentrated product is discharged through this pipe 8 and pump 9.

A pipe 10 containing a pump 11 is connected to the ripening tank 1. This pipe 10 is connected to a lower stage of the freeze concentrator and discharges the ice to this lower stage.

Such an apparatus is described in detail in EP-B-0,051,340.

The lefthand part of FIG. 3 corresponds entirely to FIG. 2, and the same reference numbers are used therein. According to the invention, a module in which the viscosity of the product is increased is placed downstream of the concentrator stage with the highest concentration according to FIG. 2.

this module is shown in the righthand part of FIG. 3.

This module comprises a ripening tank 12 with a movable element 13. The filter is now omitted. A pipe 14 is connected by means of a pump 15 to a scraped surface heat exchanger 16 which is connected by means of another pipe 17 to the ripening tank 12. A pipe 18 contains a pump 19 and leads to a centrifuge 20. Pipes 21 and 22, which are connected to tanks 23, 24 respectively, connect to said centrifuge 20. The tank 23 is intended for taking thickened ice slurry, and the tank 24 is intended for taking the crystal-free product. Connecting to the tank 24 is a pipe 25 containing a pump 26, which discharges the crystal-free product or mother liquor from the apparatus.

Connected to the tank 23 is a pipe 27 with a pump 28 which takes the ice slurry back through a pipe 29 to the ripening tank 1. The ice slurry can be made more readily pumpable through the admixture of liquid from tank 1 to tank 23.

The centrifuge 20 is provided with a cooling system (not shown), in order to absorb the heat of friction and to prevent the product concentration from being reduced by dilution with melted ice.

The tanks 23 and 24 and also the centrifuge 20 itself are kept under a nitrogen atmosphere, in order to prevent oxidation of the product and loss of aroma and flavour.

As already said, the thickened slurry stream is transported back through the pipe 29 to the highest stage of the freeze concentrator. Sometimes it is not acceptable to convey the whole thickened slurry stream to this stage. In that case the thickened slurry can be conveyed back to one of the lower concentration stages. Sometimes it is desirable to melt the ice completely or partially.

Although the crystallization section of the module according to the preferred embodiment comprises a ripening tank and scraped surface heat exchanger, it is possible to use a drum crystallizer, which means a well agitated scraped well tank, thus in fact a combined ripening tank and scraped surface heat exchanger. It is also possible to use scraped surface heat exchangers without a ripening tank, which means that the output of the heat exchanger then goes directly to the centrifuge.

The embodiment shown is, however, the preferred one, because crystals of superior size are produced in this way, which has a great effect on the separation efficiency of the centrifuge.

If the capacity of the freeze concentrator is such that a very large quantity of ice must be produced in production circumstances, or if the desired end concentration cannot be achieved with one module, it is advantageous in connection with the lower viscosity to produce a part of the ice at a concentration lying between the concentration of the ordinary freeze concentrator and the concentration of the end product. This then sometimes takes place in two stages, which two-stage concentrator is shown in FIG. 4, in which the same reference numbers are used for the first stage and the same reference numbers with apostrophes are used for the second stage.

As in FIG. 3, the pipe 8 comes from the highest stage of the ordinary freeze concentrator. From the tanks 23 and 23' the ice slurry goes back through the pipes 29, 29' to the freeze concentrator.

the crystal-free product is conveyed from the tank 24 through a pipe 30 to the second stage, indicated with apostrophes. The crystal-free product is discharged from the tank 24' through pipe 30.

EXAMPLE

This example (see FIG. 3) describes a module used in conjunction with an existing freeze concentrator which is capable of producing 55 wt % orange juice at a capacity of over 4 tonnes per hour. The feed to the conventional freeze concentrator is 12 wt % and its product, 45 wt %, is the feed for the high viscosity module. The flow codes are indicated encircled in FIG. 3. Table 3 indicates the size and the composition of the flows.

A stream of low concentrate (100), the feed to the high-viscosity module, enters the module in the circulation pipe over the heat exchanger 16. The feed is mixed with a small slurry stream (101) before it reaches the heat exchanger 16. Enough ice is produced in the heat exchanger to achieve the desired product concentration of 55 wt %. The output from the heat exchanger 16 is conveyed to the well mixed ripening tank 12. From this ripening tank 12 the feed is taken via (103) to the centrifuge 20, in which it is separated into a thickened slurry steam (105), which is conveyed back to the ordinary freeze concentrator, and an ice-free product stream (104), the mother liquor.

TABLE 3

| | flows | | |
|---|---|---|---|
| Code | Concentration wt % | Ice concentration wt % | Output kg/h |
| 100 | 45 | 0 | 10465 |
| 101 | 55 | 18 | 1000 |
| 102 | 55 | 18 | 11465 |
| 103 | 55 | 18 | 10465 |
| 104 | 55 . | 0 | 4186 |
| 105 | 55 | 30 | 6279 |

I claim:

1. A process for freeze-concentrating food liquids without the loss of product or flavor, by conveyance through a multi-stage freeze concentrator comprising the steps of:

concentrating a food liquid in a freeze concentrator;
conveying said food liquid from said freeze concentrator to a module;
increasing the concentration by crystallization of said food liquid in said module; and centrifuging the increased concentrated food liquid obtained from said module to partially separate a mother liquid, thereby yielding a food liquid with at least about a 50 wt. % concentration.

2. The process according to claim 1, wherein said crystallization step is performed by a scraped surface heat exchanger in conjunction with a ripening tank to which a centrifuge used in said centrifuging step is operationally connected.

3. The process according to claim 1, wherein a centrifuge used in said centrifuging step is cooled.

4. The process according to claim 1, wherein said centrifuging step is performed in a nitrogen environment.

5. The process according to claim 1, wherein said crystallization step is performed by means of a drum crystallizer.

6. The process according to claim 5, wherein said drum crystallizer is comprised of a ripening tank and a heat exchanger.

7. The process according to claim 2, wherein the entire crystallization step is performed solely in said scraped surface heat exchanger.

8. The process according to claim 1, wherein a thickened slurry of said food liquid is at least partially melted and is fed to the stage of the concentrator whose concentration lies closes to that of the melt of said food liquid.

9. The process according to claim 1, wherein more than one module is used in series to increase the concentration of said food liquids.

* * * * *